United States Patent
Abate et al.

(10) Patent No.: US 6,587,625 B1
(45) Date of Patent: Jul. 1, 2003

(54) OPTICAL FIBER APPARATUS FOR HIGH-RADIATION ENVIRONMENTS

(75) Inventors: Joseph A. Abate, Lafayette, NJ (US); Robert George Ahrens, Chatham, NJ (US); David John DiGiovanni, Montclair, NJ (US); Michael James LuValle, Morristown, NJ (US); Herman Melvin Presby, Highland Park, NJ (US); Robert Scott Windeler, Clinton, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/504,554

(22) Filed: Feb. 15, 2000

(51) Int. Cl.7 ............................. G02B 6/02; G02B 6/36; G02B 6/00
(52) U.S. Cl. .................... 385/124; 385/92; 385/137
(58) Field of Search .............................. 385/123, 124, 385/126, 127, 128, 88, 92, 135, 137

(56) References Cited

U.S. PATENT DOCUMENTS

| 4,685,945 A | | 8/1987 | Freund |
| 5,153,931 A | * | 10/1992 | Buchanan et al. .......... 385/123 |
| 5,867,618 A | * | 2/1999 | Ito et al. ..................... 385/37 |

* cited by examiner

Primary Examiner—Euncha Cherry

(57) ABSTRACT

Applicants have discovered an apparatus and method effective for use in rendering an optical fiber resistant to losses caused by high-radiation environments such as in outer-space. The apparatus comprises an optical fiber, a housing surrounding the optical fiber defining an enclosed space between the exterior surface of the fiber and the housing, and a concentration of deuterium or hydrogen gases disposed within the enclosed space.

11 Claims, 2 Drawing Sheets

OPTICAL FIBER APPARATUS FOR HIGH-RADIATION ENVIRONMENTS

FIELD OF THE INVENTION

The present invention relates to an optical fiber device for use in a high-radiation environment, and more particularly, to a fiber optic device that is resistant to radiation-induced transmission losses.

BACKGROUND OF THE INVENTION

Optical fibers and optical fiber components are useful for telecommunication transmission and networking. Basically, optical fibers are thin strands of glass capable of transmitting information-containing optical signals over long distances with low loss. In essence, an optical fiber is a small diameter waveguide comprising a core having a first index of refraction surrounded by a cladding having a second (lower) index of refraction. As long as the refractive index of the core exceeds that of the cladding, a light beam propagated along the core exhibits total internal reflection, and it is guided along the length of the core. Typical optical fibers are made of high purity silica, and various concentrations of dopants may be added to control the index of refraction.

Recently interest has grown in the use of optical fibers and communications systems in high-radiation environments such as the outerspace, e.g., in low earth orbit and interplanetary satellites. For example, a satellite communications system incorporating use of optical fibers is disclosed in U.S. Pat. No. 5,475,520, issued Dec. 12, 1995 to Wissinger, "Satellite Communications System." However, the outerspace environment is deleterious to fiber optics. Outerspace presents a natural radiation environment, for example, due to the presence of energetic charged particles, x-rays, gamma rays, and heavy ions. This adverse radiation environment degrades the optical fiber's properties over a period of time resulting in a decrease in transmission throughput. This effect is particularly prominent in optical fibers containing rare-earth dopants. Exposure of the fibers to the radiation environment of outerspace can cause the fibers to suffer significant losses over time.

Thus, there is an interest in developing optical fibers and an optical fiber apparatus that would be suitable for use in high-radiation environments such as in outerspace, nuclear reactors, or undersea applications. In particular, it would be useful to have an optical fiber that would be resistant to degradation from radiation present in such environments.

SUMMARY OF THE INVENTION

Summarily described, the invention embraces an optical fiber apparatus adapted for use in a high-radiation environment, including a satellite communications system. The apparatus comprises an optical fiber, a housing surrounding the optical fiber and defining an enclosed space between the exterior surface of the fiber and the housing, and a concentration of deuterium or hydrogen gases disposed within the enclosed space. Applicants have discovered that the adverse effects of a high-radiation environment can be significantly reduced and nearly eliminated by maintaining the optical fiber in an environment of hydrogen or deuterium gases.

BRIEF DESCRIPTION OF THE DRAWINGS

For a better understanding of the invention, an exemplary embodiment is described below, considered together with the accompanying drawings, in which.

Figure 1:
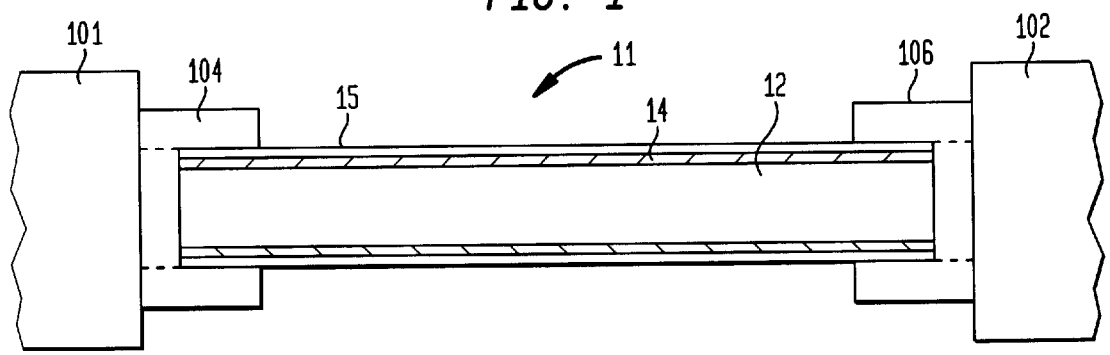
FIG. 1 schematically illustrates a cross-sectional view of one embodiment of the inventive optical fiber apparatus coupled to a transmitter and receiver.

It is to be understood that these drawings are for the purposes of illustrating the concepts of the invention and are not to scale.

DETAILED DESCRIPTION OF THE INVENTION

Applicants have discovered that the sensitivity of an optical fiber to the adverse effects of a high-radiation environment such as the outerspace can be mitigated by disposing the fiber in the presence of hydrogen or deuterium. The effect of radiation on the fiber under these circumstances is reduced to essentially zero.

Previous attempts have been made to render optical fibers resistant to hydrogen induced losses by exposing the fibers to deuterium and/or hydrogen. For example, U.S. Pat. No. 4,685,945 issued Aug. 11, 1987 to Freund, "Method of Processing High Purity Low-OH Vitreous Silica Fibers" (incorporated herein by reference), describes a method of enhancing long-term stability in high purity vitreous silica optical fibers by permeating deuterium molecules into the fiber and then propagating through the fiber light having a wavelength of up to about 650 nm and at an intensity of at least 10 Lambert units. With this technology, it was thought that defect sites in the fibers, e.g., peroxy linkages, could be pre-reacted with deuterium to produce deuteroxyl groups (OD) so that they would not be actuated again (e.g., with hydrogen molecules to produce hydroxy groups (OH)). The method of Freund presents disadvantages in that the fiber is exposed to high-intensity UV radiation.

To produce the deuteroxyl groups, X-ray or gamma radiation or temperatures of about 500° C., or at least greater than 200° C., were thought to be necessary (col. 2, 1. 30–43). See also U.S. Pat. No. 4,389,230 to Modone et al., issued Jun. 21, 1983, Process for Improving the Transmission Characteristics of Optical Fibers Drawn from Preforms Made by the MCVD Technique (involving heat treatment of fibers with deuterium at a temperature of at least 500° C.), incorporated herein by reference. Such high temperatures are disadvantageous as they could, among other things, destroy polymeric coatings on the fibers (see, e.g., Freund, col. 2, 1. 47–51). A method for passivating optical fibers against hydrogen-induced losses without the need for high temperatures or high-intensity radiation is described in U.S. patent application Ser. No. 08/897,873, filed Jul. 21, 1997 now U.S. Pat. No. 6,499,318, also incorporated herein by reference.

Applicants have discovered that these approaches for passivating the optical fiber are ineffective when the fiber is placed in a high-radiation environment such as in the outerspace. By "outerspace" applicants intend to refer to any region outside the protective region of the Earth's atmosphere. The radiation intensity in outerspace, as well as on Earth, is highly variable and difficult to quantify. However, by "high radiation" environment as used herein is meant that the radiation field level is significantly increased as compared with ambient conditions such that a traditional optical fiber would experience substantial throughput losses (e.g., greater than 1 dB/m), over an operating period of approximately one year. Incorporating hydrogen or deuterium into the fiber itself is not effective in these environments because the hydrogen or deuterium molecules tend to diffuse out of the fiber.

Applicants have discovered an apparatus and method that is effective for reducing losses when the fibers are placed in high-radiation conditions. In particular, the apparatus comprises an optical fiber, a housing surrounding the optical fiber and defining an enclosed space between the exterior surface of the fiber and the housing, and a concentration of deuterium or hydrogen gases disposed within the enclosed space. For example, FIG. 1 schematically represents a cross-sectional view of an exemplary embodiment of the apparatus, showing a length of fiber 11 coupled to a transmitter 101 and a receiver 102 with optical couplers 104, 106, respectively. The fiber has a core 12 and a cladding 14 surrounding the core. The housing 15 surrounds the exterior surface of the fiber and encloses the fiber over the length of fiber exposed to the ambient. The housing 15 may be configured as a tube and essentially comprise an additional cladding layer surrounding the fiber. The housing or tube 15 may be fabricated with a material that resists the diffusion of hydrogen or deuterium including carbon, glass, stainless steel, aluminum, titanium, platinum, or other stable metallic materials known in the field. Hydrogen or deuterium gasses 16 are placed within the tube. Advantageously, the concentration of gasses 16 is sufficient such that the average concentration of either deuterium or hydrogen in the fiber core is maintained at about 0.1 percent by volume or more. Thus, during operation, the fiber is continuously exposed to hydrogen or deuterium.

Figure 2:
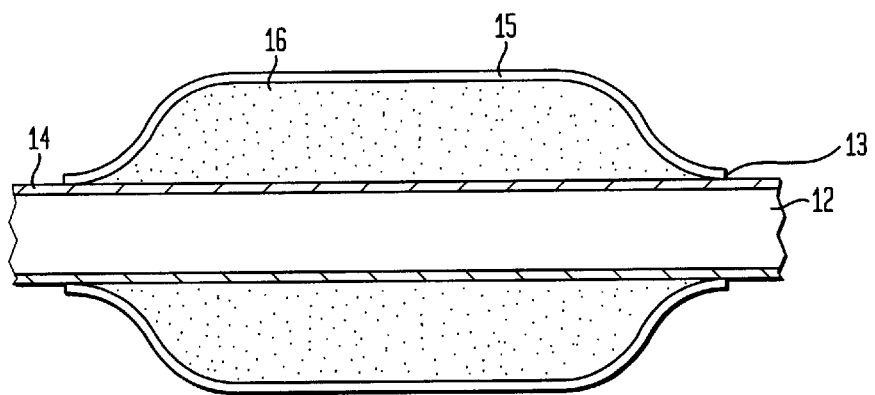
FIG. 2 schematically illustrates a cross-sectional view of an alternative embodiment of the inventive optical fiber apparatus.
Figure 3:
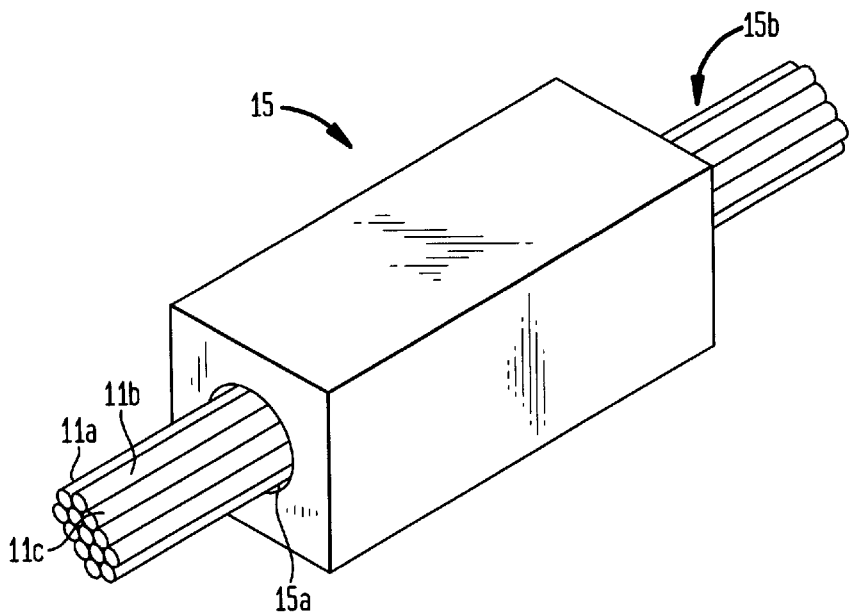
FIG. 3 is a schematic perspective view of an alternative embodiment of the invention comprising a plurality of optical fibers.

FIG. 2 schematically illustrates a cross-sectional view of an alternative embodiment of the inventive optical fiber apparatus. Here, the housing 15 is shown configured as a package enclosing a portion of the length of the fiber. The fiber maybe bonded to the housing by epoxy bonds 13 or other bonding methods, e.g., solder bonding, so that a hermetic seal is provided. The housing may be configured into various shapes, e.g., it may be circular, cylindrical, conical, or rectangular, the important consideration being that the housing and fiber are sufficiently sealed such that the gasses 15 will be held within the housing to surround the fiber. The housing may have entry and exit ports for the optical fiber, and one housing may be used to simultaneously surround a plurality of fibers, if desired. For example, FIG. 3 schematically illustrates a perspective view of a plurality of optical fibers 11a, 11b, 11c, etc., surrounded by a rectangular housing 15 having an entry port 15a and exit port 15b for the fibers. The fibers themselves may be sealed to the packaged housing to maintain an overall hermetic seal.

Figure 4:
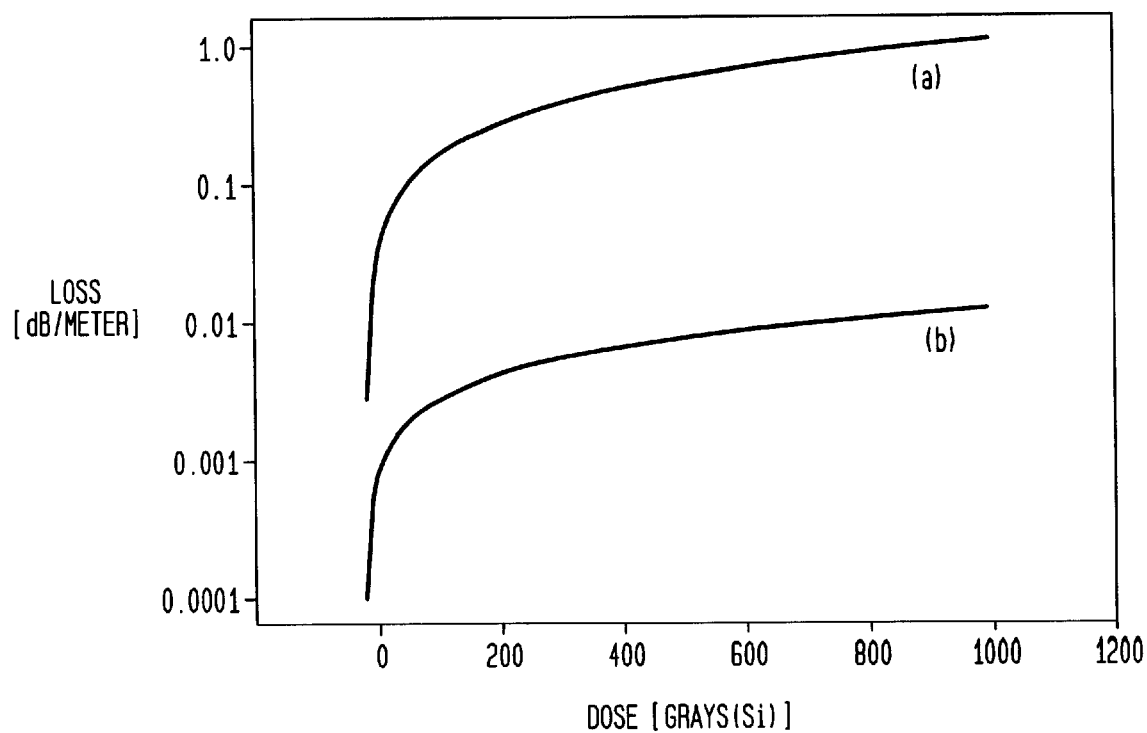
FIG. 4 is a graph illustrating the increased radiation hardness achieved with the inventive apparatus.

FIG. 4 is a graph illustrating the advantages of using the inventive apparatus. Plot (a) of FIG. 4 shows the increase in transmission losses of an untreated optical fiber during exposure to radiation with dosages of up to 1000 Grays radiation, and plot (b) shows the increase in transmission loss for an optical fiber during the same conditions of exposure as in plot (a), but where the optical fiber is packaged in a deuterium-containing as with the housing apparatus of this invention. As can be seen, the transmission losses are substantially decreased when the invention is used. When the optical fibers are exposed to dosages of up to 1000 Grays radiation, the packaged fiber's losses are decreased by two orders of magnitude (i.e., a factor of 100).

It is understood that the embodiments described herein are merely exemplary and that a person skilled in the art may make variations and modifications without departing from the spirit and scope of the invention. All such variations and modifications are intended to be included within the scope of the appended claims.

We claim:

1. An optical fiber communication system adapted for use in high-radiation conditions comprising:

an optical transmitter;

an optical receiver;

optically coupled between the transmitter and the receiver, a length of optical fiber comprising a core having a predetermined refractive index, at least one cladding layer surrounding the core having a refractive index that is less than the refractive index of the core, and an exterior surface;

a housing surrounding the length of optical fiber and defining an enclosed space between the exterior surface of the fiber and the housing; and a concentration of deuterium or hydrogen gases disposed within the enclosed space for maintaining the length of optical fiber in the presence of the deuterium or hydrogen gases at a substantially constant deuterium or hydrogen gas pressure.

2. The apparatus of claim 1 adapted for continuously maintaining the length of optical fiber in the presence of deuterium or hydrogen gases.

3. The apparatus of claim 1 comprising a plurality of lengths of optical fiber surrounded by the housing.

4. The apparatus of claim 1 comprising one length of optical fiber surrounded by the housing.

5. The apparatus of claim 4 in which the housing comprises a tube defining a cladding layer surrounding the length of optical fiber.

6. The apparatus of claim 5 in which the tube is fabricated with a material that resists the diffusion of hydrogen or deuterium therethrough.

7. The apparatus of claim 1 in which the optical fiber is adapted for use in outerspace.

8. The apparatus of claim 1 in which the concentration of deuterium or hydrogen gases disposed within the enclosed space is about 0.1 percent by volume.

9. A method for rendering an optical communication system comprising a length of optical fiber resistant to degradation from the radiation environment of the outerspace comprising the steps of encasing the length of optical fiber in a housing containing a concentration of deuterium or hydrogen gases and continuously maintaining the length of optical fiber in the presence of the deuterium or hydrogen gases at a substantially constant deuterium or hydrogen gas pressure during use of the fiber in outerspace.

10. A space-based communications system comprising the optical fiber apparatus of claim 1.

11. An optical fiber communication system adapted for use in high-radiation conditions comprising:

an optical transmitter;

an optical receiver;

optically coupled between the transmitter and the receiver, a length of optical fiber comprising a core having a predetermined refractive index, at least one cladding layer surrounding the core having a refractive index that is less than the refractive index of the core, and an exterior surface;

a tube surrounding the at least one cladding layer to provide a second cladding layer defining an enclosed space between the exterior surface of the length of optical fiber and the tube, the tube being fabricated with a material that resists the diffusion of hydrogen or deuterium therethrough; and a concentration of deuterium or hydrogen gases disposed within the enclosed space for maintaining the average concentration of either deuterium or hydrogen in the fiber core at about 0.1 percent by volume or more at a substantially constant deuterium or hydrogen gas pressure to thereby substantially protect the optical fiber from throughput losses due to the high-radiation conditions.

* * * * *